(12) United States Patent
Knopf et al.

(10) Patent No.: US 11,389,955 B2
(45) Date of Patent: Jul. 19, 2022

(54) SERVO-PNEUMATIC CONTROL SYSTEMS FOR SOFT ROBOTIC ACTUATORS

(71) Applicant: Soft Robotics, Inc., Cambridge, MA (US)

(72) Inventors: Ryan Knopf, Cambridge, MA (US); Joshua Aaron Lessing, Cambridge, MA (US)

(73) Assignee: Soft Robotics, Inc., Bedford, MA (US)

(*) Notice: Subject to any disclaimer, the term of this patent is extended or adjusted under 35 U.S.C. 154(b) by 1125 days.

(21) Appl. No.: 15/941,391

(22) Filed: Mar. 30, 2018

(65) Prior Publication Data
US 2019/0030714 A1  Jan. 31, 2019

Related U.S. Application Data

(60) Provisional application No. 62/478,771, filed on Mar. 30, 2017.

(51) Int. Cl.
*G06F 17/00* (2019.01)
*B25J 9/16* (2006.01)
(Continued)

(52) U.S. Cl.
CPC .............. *B25J 9/1612* (2013.01); *B25J 9/142* (2013.01); *B25J 15/0023* (2013.01); *B25J 15/02* (2013.01);
(Continued)

(58) Field of Classification Search
CPC . B25J 9/1612; B25J 9/142; B25J 15/02; B25J 15/0023; F15B 9/09; F15B 13/0402;
(Continued)

(56) References Cited

U.S. PATENT DOCUMENTS

| 5,607,080 A | * | 3/1997 | O'Dougherty | B67D 7/0238 |
| | | | | 222/158 |
| 6,870,343 B2 | * | 3/2005 | Borenstein | B08B 9/045 |
| | | | | 180/9.21 |

(Continued)

FOREIGN PATENT DOCUMENTS

| CA | 2981894 A1 * 10/2016 | ............. B25J 9/142 |
| CN | 204712060 10/2015 | |

(Continued)

OTHER PUBLICATIONS

International Search Report and Written Opinion for corresponding PCT Application No. PCT/US2018/025362.
(Continued)

*Primary Examiner* — Ronnie M Mancho
(74) *Attorney, Agent, or Firm* — Goodwin Procter LLP

(57) ABSTRACT

Exemplary embodiments relate to the use of servo-pneumatic control systems for actuation and de-actuation of soft robotic actuators. Apparatuses and methods are disclosed for using a servo-pneumatic control system in fluid communication with the soft robotic actuator and configured to maintain a closed loop in which at least one of pressure, mass of fluid, or volume of fluid is controlled within the soft robotic actuator. The embodiments may be used to prevent deformation of grasped objects; detect grasping, collision, and releasing objects; and other operations with a rapid servo-pneumatic response.

19 Claims, 14 Drawing Sheets

(51) Int. Cl.
  *B25J 15/00* (2006.01)
  *B25J 9/14* (2006.01)
  *B25J 15/02* (2006.01)
  *F15B 9/09* (2006.01)
  *F15B 13/04* (2006.01)
  *F15B 15/10* (2006.01)
  *F15B 15/14* (2006.01)

(52) U.S. Cl.
  CPC ............ *F15B 9/09* (2013.01); *F15B 13/0402* (2013.01); *F15B 15/10* (2013.01); *F15B 15/14* (2013.01); *F15B 2013/0409* (2013.01)

(58) Field of Classification Search
  CPC ... F15B 15/10; F15B 15/14; F15B 2013/0409
  USPC ......................................................... 700/260
  See application file for complete search history.

(56) References Cited

U.S. PATENT DOCUMENTS

| | | | |
|---|---|---|---|
| 9,703,381 B2* | 7/2017 | Gallo | A61B 34/74 |
| 11,033,830 B2* | 6/2021 | Murison | F15B 11/16 |
| 2007/0295924 A1* | 12/2007 | Clausen | G05B 11/42 |
| | | | 251/129.04 |
| 2014/0109560 A1* | 4/2014 | Ilievski | B25J 9/142 |
| | | | 60/327 |
| 2015/0283699 A1* | 10/2015 | Morin | B25J 9/142 |
| | | | 700/259 |
| 2016/0114482 A1* | 4/2016 | Lessing | B25J 15/0616 |
| | | | 606/130 |
| 2016/0135799 A1* | 5/2016 | Lessing | A61B 17/02 |
| | | | 600/207 |
| 2016/0136820 A1* | 5/2016 | Lessing | B25J 15/12 |
| | | | 294/208 |
| 2016/0238040 A1* | 8/2016 | Gallo | A61H 9/0078 |
| 2016/0263751 A1* | 9/2016 | Galloway | B25J 15/12 |
| 2016/0361821 A1* | 12/2016 | Lessing | B25J 15/0061 |
| 2016/0375590 A1* | 12/2016 | Lessing | B25J 15/12 |
| | | | 294/196 |
| 2017/0021284 A1* | 1/2017 | Murison | A61H 9/0078 |
| 2017/0028566 A1* | 2/2017 | Knopf | B25J 15/0023 |
| 2017/0203443 A1* | 7/2017 | Lessing | B25J 15/0616 |
| 2017/0239821 A1* | 8/2017 | Lessing | B25J 13/085 |
| 2017/0291806 A1* | 10/2017 | Lessing | B25J 9/1612 |
| 2019/0030714 A1* | 1/2019 | Knopf | F15B 13/0402 |
| 2019/0047156 A1* | 2/2019 | Curhan | B25J 13/085 |
| 2019/0056248 A1* | 2/2019 | Shepherd | B25J 9/142 |
| 2019/0061170 A1* | 2/2019 | Curhan | B25J 15/103 |
| 2019/0084165 A1* | 3/2019 | Curhan | B25J 9/123 |

FOREIGN PATENT DOCUMENTS

| | | |
|---|---|---|
| CN | 204712060 U | 10/2015 |
| CN | 105437224 | 3/2016 |
| CN | 105437224 A | 3/2016 |
| JP | 11226679 | 8/1999 |
| JP | H11226679 A | 8/1999 |
| JP | 200583447 A | 3/2005 |
| JP | 2008121783 A | 5/2008 |
| JP | 201641465 A | 3/2016 |
| WO | 2008090753 A1 | 7/2008 |
| WO | 2015123128 | 8/2015 |
| WO | 2015123128 A1 | 8/2015 |
| WO | WO-2016154355 A1 * | 9/2016 ........ B25J 15/0023 |
| WO | 2017020047 | 2/2017 |
| WO | 2017020047 A1 | 2/2017 |

OTHER PUBLICATIONS

International Search Report and Written Opinion of PCT/US2018/025362; dated Sep. 28, 2018, 16 pages.

Office Action issued in Japanese Patent Application No. JP2019-553063, dated Apr. 11, 2022, 4 pages.

* cited by examiner

900

```
START
  │
  ▼
┌─────────────────────────────────────────────────────┐
│ GRASP A TARGET WITH A GRIPPER COMPRISING A PLURALITY │
│         OF SOFT ROBOTIC ACTUATORS                    │
│                                                      │
│                      902                             │
└─────────────────────────────────────────────────────┘
  │
  ▼
┌─────────────────────────────────────────────────────┐
│         DETECT AN ACCELERATION OF THE GRIPPER        │
│                                                      │
│                      904                             │
└─────────────────────────────────────────────────────┘
  │
  ▼
┌─────────────────────────────────────────────────────┐
│   ADJUST A VOLUME OF FLUID IN A FIRST ONE OF THE     │
│ PLURALITY OF SOFT ROBOTIC ACTUATORS IN RESPONSE TO   │
│  THE DETECTED ACCELERATION TO COMPENSATE FOR         │
│        EFFECTS OF INERTIA ON THE TARGET              │
│                                                      │
│                      906                             │
└─────────────────────────────────────────────────────┘
```

```
START
  │
  ▼
┌─────────────────────────────────────────────┐
│ INFLATE A SOFT ROBOTIC ACTUATOR WITH AN     │
│ INFLATION FLUID, WHEREIN AN INTERIOR VOLUME │
│ OF THE SOFT ROBOTIC ACTUATOR INCREASES      │
│                                             │
│ 1102                                        │
└─────────────────────────────────────────────┘
  │
  ▼
┌─────────────────────────────────────────────┐
│ MEASURE A FLOW RESPONSE OF THE ACTUATOR     │
│ DURING INFLATION                            │
│                                             │
│ 1104                                        │
└─────────────────────────────────────────────┘
  │
  ▼
┌─────────────────────────────────────────────┐
│ DETECT A CHANGE IN INFLATION FLUID FLOW     │
│ DURING INFLATION                            │
│                                             │
│ 1106                                        │
└─────────────────────────────────────────────┘
  │
  ▼
┌─────────────────────────────────────────────┐
│ TRANSMIT A SIGNAL ACCORDING TO THE DETECTED │
│ CHANGE                                      │
│                                             │
│ 1108                                        │
└─────────────────────────────────────────────┘
```

FIG. 11

SERVO-PNEUMATIC CONTROL SYSTEMS FOR SOFT ROBOTIC ACTUATORS

RELATED APPLICATIONS

The present application claims priority to U.S. Provisional Application Ser. No. 62/478,771, filed on Mar. 30, 2017 and entitled "Servo-Pneumatic Control Systems for Soft Robotic Actuators." The contents of the aforementioned application are incorporated herein by reference.

FIELD OF THE DISCLOSURE

The disclosure relates generally to the field of robotics and particularly to novel control systems for actuating and de-actuating soft robotic actuators.

BRIEF DESCRIPTION OF THE DRAWINGS

FIG. 9 is a logic flow according to exemplary embodiments;

FIG. 11 is a third logic flow according to exemplary embodiments;

DETAILED DESCRIPTION OF THE PREFERRED EMBODIMENTS

Figure 1A:
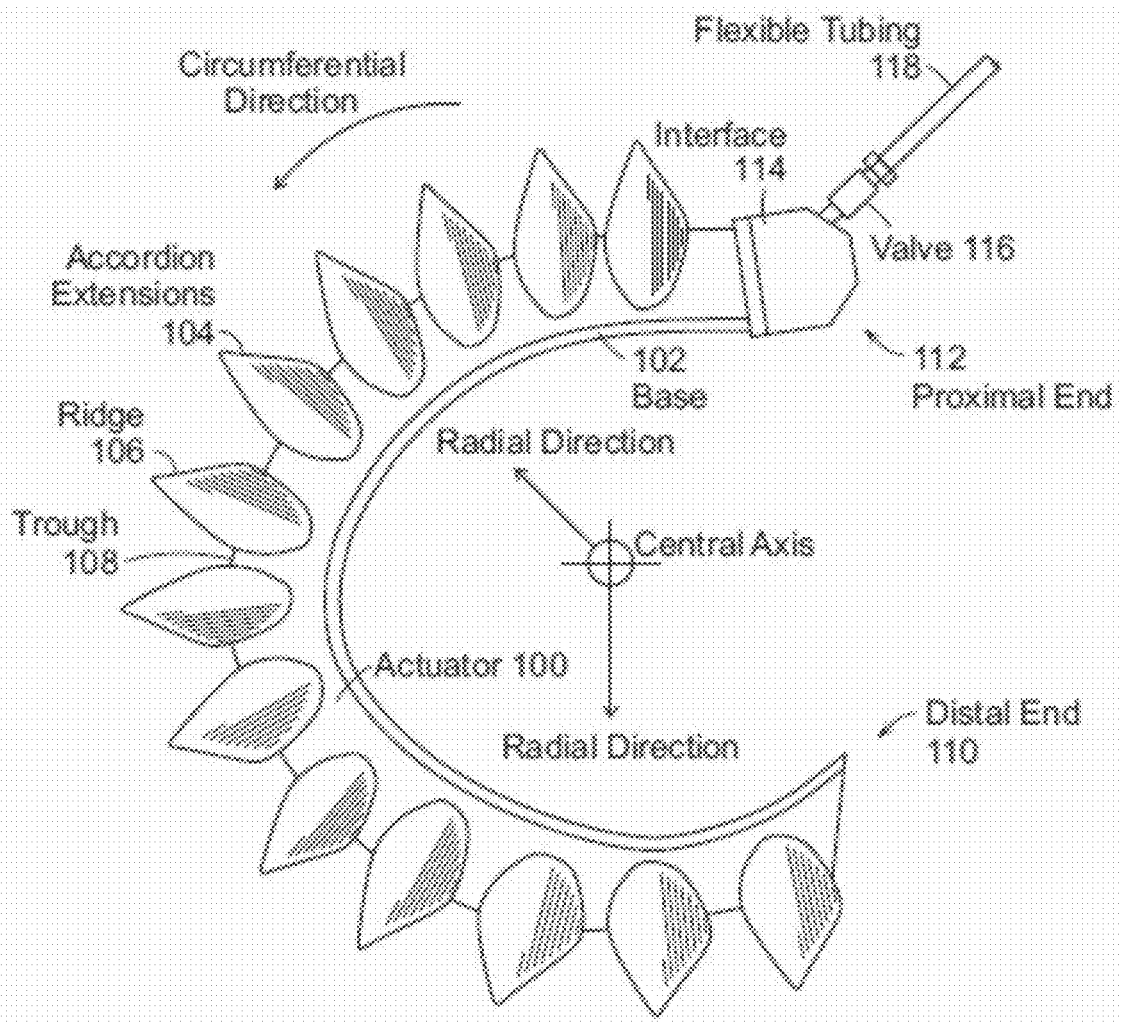
FIG. 1A-D depict exemplary soft robotic actuators that may be used according to exemplary embodiments.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Introduction to Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, twist, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively, or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or with the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
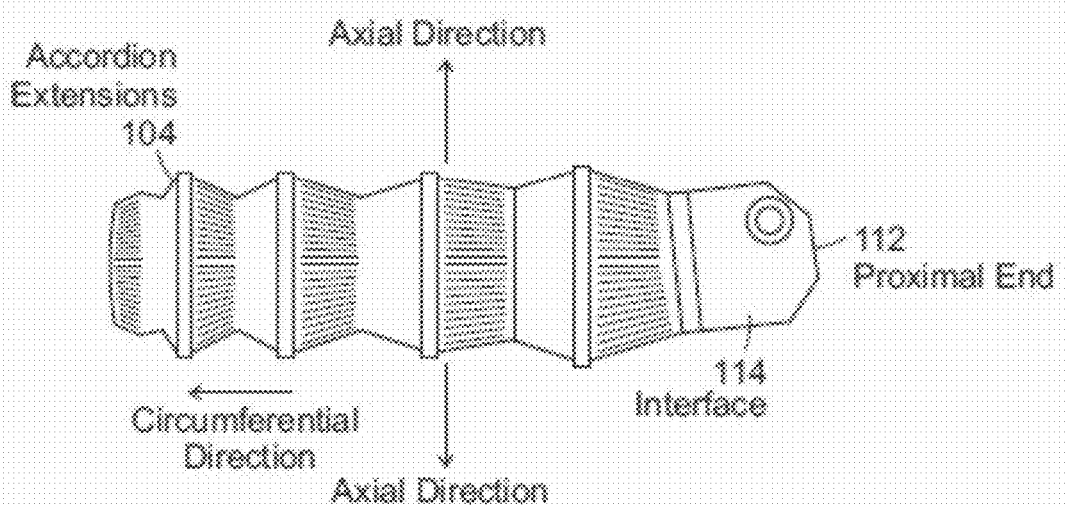
Figure 1C:
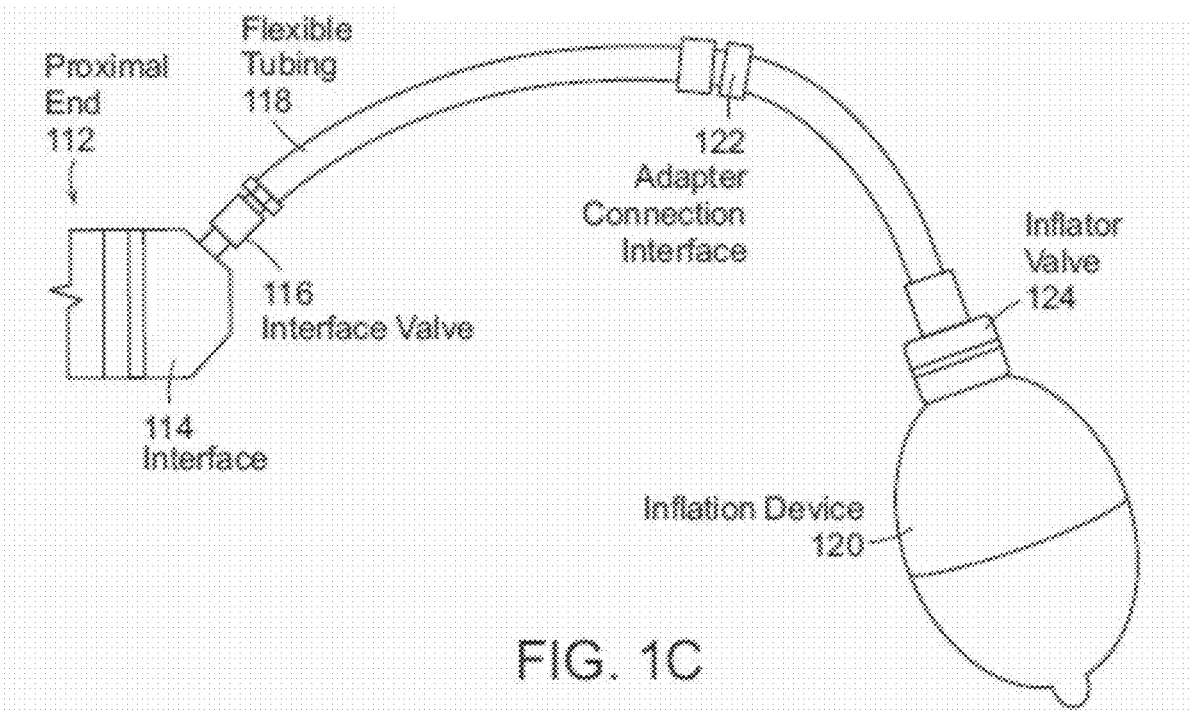
Figure 1D:
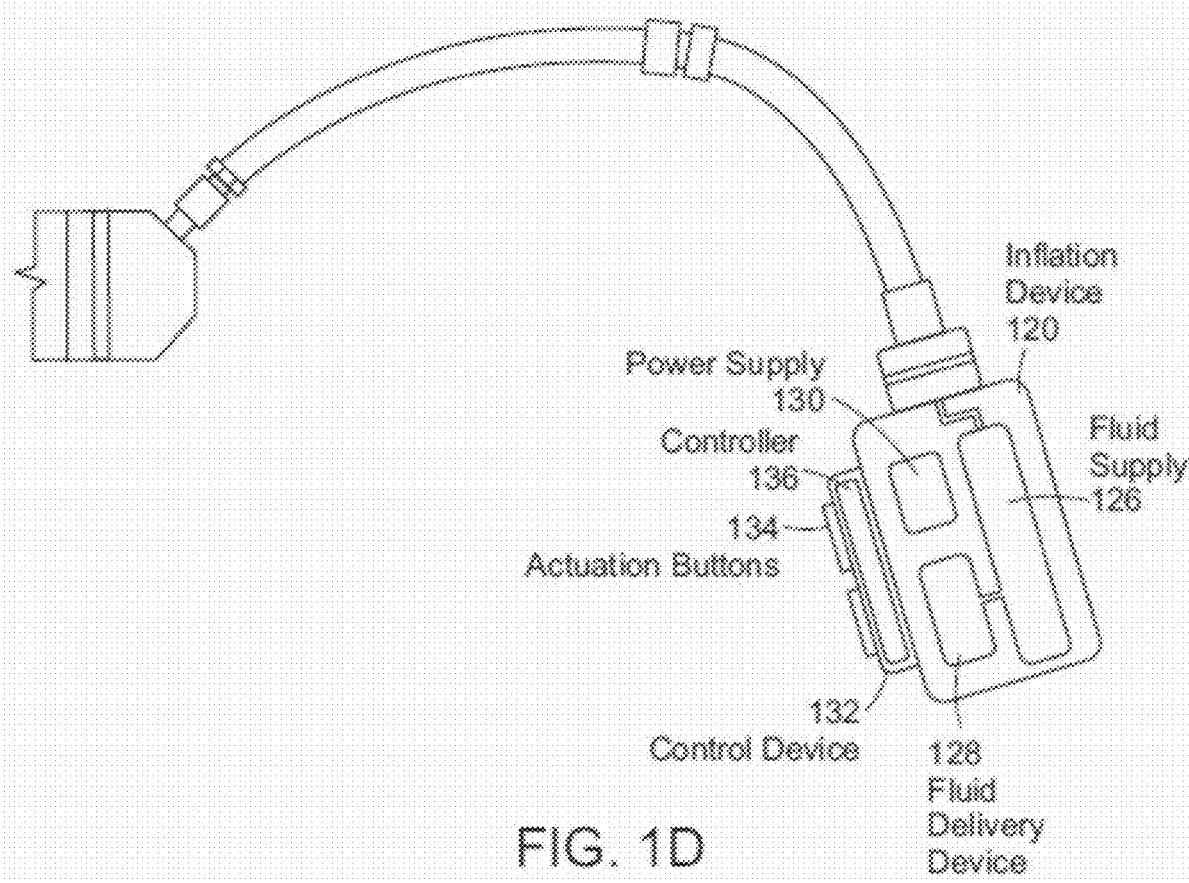

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100).

The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the retractor to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to a hub or other robotic components.

The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an adapter connection interface 122 for releasably connecting to the interface 114 at one end and the inflation device 120 at the other end. By separating the two parts of the adapter connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively, or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

Servo-Pneumatic Control Systems for Soft Robotic Actuators

Exemplary embodiments encompass several aspects of control systems for soft robotic actuators. Some embodiments provide servo-pneumatic control systems which may, for example, be used in place of the above-described inflation devices 120. Further embodiments, which may be used separately or in conjunction with the servo-pneumatic control systems, may be used to control and/or monitor an actuator and/or grasp target.

Background on Servo-Pneumatics

Servo-Pneumatics encompasses a narrow field of pneumatic systems which use proportionally controllable directional valves to accomplish high frequency closed loop control of dynamic processes. In control applications that require high response bandwidth and repeatability but are heavily energy, space, weight, or cost constrained, servo-pneumatics can offer performance similar to traditional electro-mechanical linear and rotary servo-mechanisms while using comparatively small amounts of electrical power. Exemplary servo-pneumatic control systems as described herein, for example, may deliver accurately controllable applied forces from fractions of a Newton to kilo-Newtons (e.g., 0-25 N, or more preferably 0-12 N), pressure from Pascals to Mega-Pascals, or position repeatable within 1 mm (or, more preferably, within 0.25 mm, or, still more preferably, within 0.1 mm) with exceptional immunity to external disturbances and parasitic loads.

A Servo-Pneumatic system is typically comprised of one or more low cost pneumatic control system actuators (linear pistons, volume boosters, flow restrictors, rotary pneumatic actuators, or larger pilot operated process valves), a feedback sensor that measures the error signal of interest (linear or rotary absolute position, pressure, or mass flow), and a proportional directional control valve (sometimes simply referred to as a "servo-pneumatic valve"). While the control valve, accompanying sensor, and digital controller may be expensive, the control system actuator itself is often dramatically lower in cost and complexity than a comparative electro-mechanical actuator and can be more easily replaced or serviced after significant wear degradation. In addition, because pneumatic actuators are already capable of delivering incredibly high forces in a small form factors, systems designed in this way can control dynamic processes in which reaction forces may exceed many kilo-Newtons using only a few Watts of electrical power (because the electrical actuator within the proportional directional control valve does little other than divert an already highly pressurized working fluid between different fluid conduction paths).

The proportional directional control valves may employ one or more of a few theories of operation. Common to these methods is the use of some smaller high response bandwidth electrical actuator to accurately control the position of a secondary spool whose position subsequently determines the proportional flow rate and conduction path of the working fluid. These constructs may use small high frequency piezoelectric or solenoid operated "pilot pressure" valves to precisely control the secondary spool position via a pulse width modulated pneumatic pilot pressure applied to each of the spool's ends. Other variations use electrical actuators to directly control the secondary spool position with extreme precision over a very small range of motion. Linear voice coil motors are a common choice for this approach, but slower servomotors may also be employed. A description of a typical operation of an exemplary valve is provided in FIG. 2 below.

Figure 2:
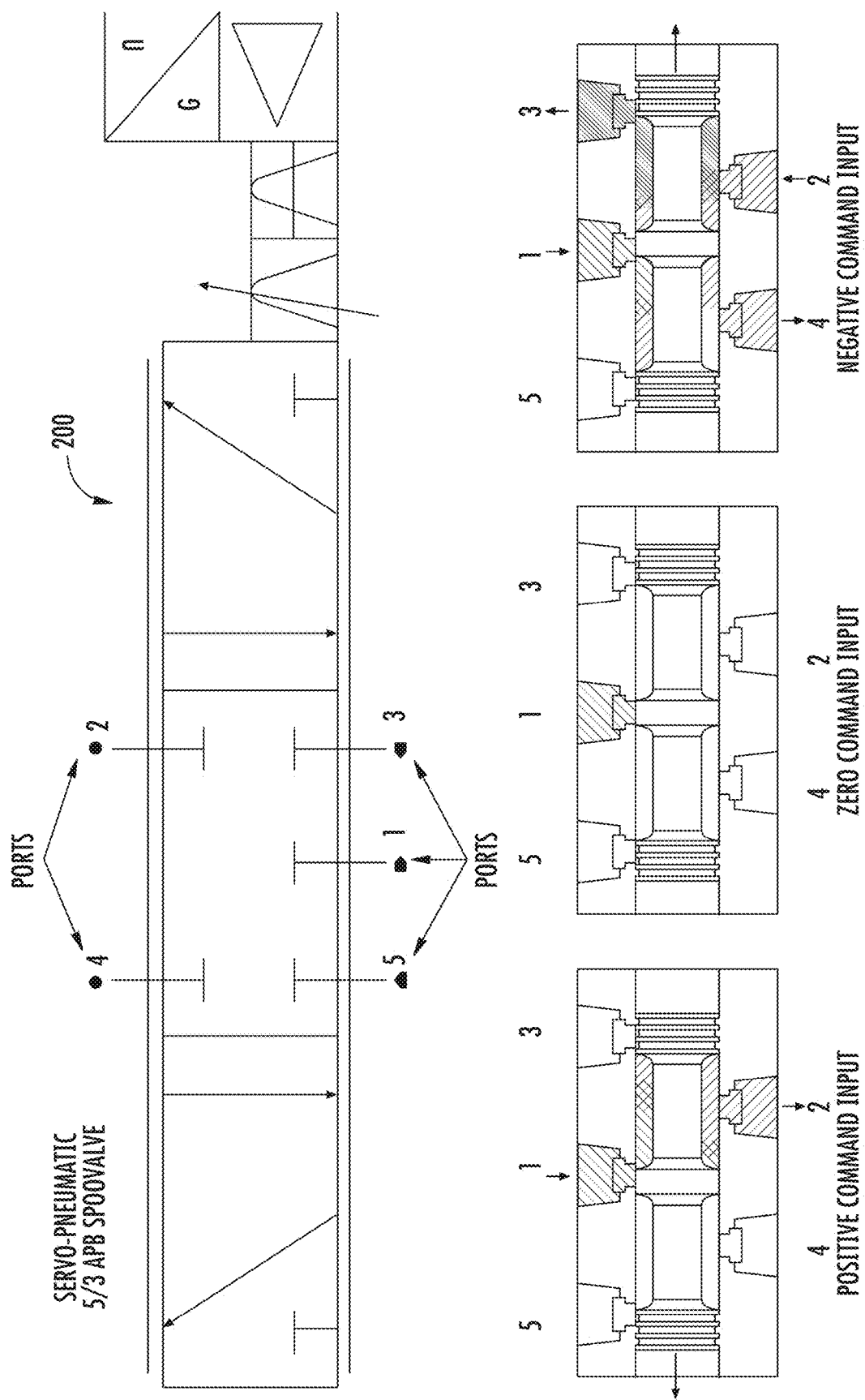
FIG. 2 depicts an exemplary five-way, three-position (5/3) all ports blocked (APB) center position servo-pneumatic spool valve that may be used according to exemplary embodiments.

FIG. 2 depicts a 5/3 (five "way" three "position") all ports blocked (APB) center position servo-pneumatic spool valve 200 that has three primary modes of operation. The spool's position to the left and right of center may be precisely controlled through the use of previously discussed electrical actuators. In one mode, when a zero-command input is received and the spool is not displaced, compressed fluid supplied to port 1 (the "pressure" port in most applications) is unable to conduct to any other port. Similarly, no fluid is able to conduct into or out of the application ports 4 and 2. When a positive command input is received, as shown to the left, the spool is displaced some distance to the left allowing pressurized fluid to flow between ports 1 and 2 at a rate which is related to the distance of the spool displacement, pressure supplied, and size of the opening. When in this state, fluid is also able to flow between ports 4 and 5. In the opposing spool state, when a negative command input is received and the spool is displaced to the right, fluid may flow between ports 1 and 4 as well as ports 2 and 3 as shown. In typical industry applications, ports 4 and 2 may be connected to the opposing ends of a standard linear pneumatic piston which is instrumented with a position sensor. A closed loop controller can then be developed which precisely controls the piston's position by constantly alternating between these two valve states.

Exemplary Servo-Pneumatic Systems for Closed Loop State Control of Soft Robotic Actuators The following section describes two techniques for accomplishing high response bandwidth closed loop state control of soft robotic actuators and exemplary embodiments of each method. For the purposes of this discussion the "state" of a soft robotic actuator may be defined as its instantaneous pressure, contained fluid mass, or actuator morphology, depending upon the desired physical effect.

Soft robotic actuators take a variety of forms, which typically employ an extensible and/or unfolding layer paired with an inextensible or less-extensible layer which, when activated by the application of a pressurized working fluid, induces curvature in the actuator construct. "Accordion soft actuators" employ a convoluted and bellowed elastomeric membrane as their extensible layer, which reduces the proportion of energy directed toward stretching the construct's elastomeric body rather than inducing mechanical bending and producing force application onto a manipulation target. An additional benefit of this actuator archetype is its ability to change state bi-directionally through the application of both positively pressurized fluid with respect to ambient conditions (to bend forward) and negatively pressurized fluid (to retract and bend in the reverse direction).

A system capable of fully controlling the state of an accordion soft actuator must be able to seamlessly generate pressures in both regimes (above and below ambient gauge pressure) in order to both supply and evacuate a working fluid. Once such system is contemplated in the following embodiment (FIG. 3).

Figure 3:
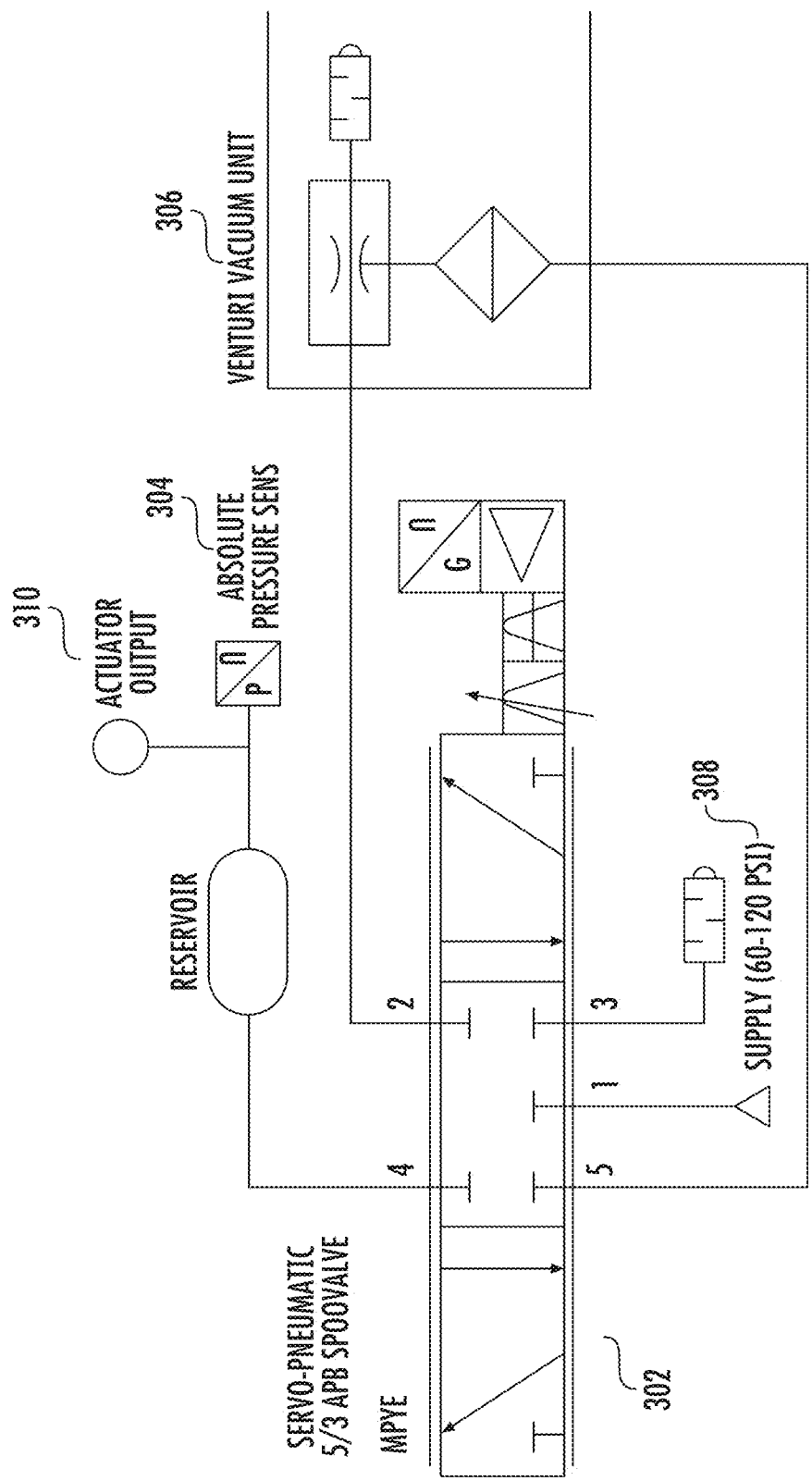
FIG. 3 depicts an exemplary servo-pneumatic control system according to exemplary embodiments.

FIG. 3 depicts an exemplary servo-pneumatic control system that uses a single supply of moderately pressurized air to maintain closed loop control of absolute pressure within a soft actuator or hub of multiple connected soft actuators. The system is comprised of a servo-pneumatic 5/3 APB (all ports blocked center) spool valve 302, an absolute pressure sensor 304, and a vacuum generation unit 306.

Although exemplary embodiments are described with respect to a particular apparatus including particular components, one of ordinary skill in the art will recognize that similar effects may be achieved using different components in different arrangements. For example, instead of a servo-pneumatic 5/3 APB valve, a standard 5/3 spool valve may be employed. Alternatively, or in addition, in place of a 5/3 servo-pneumatic voice coil driven valve, a spool driven by a worm gear or rack and pinion via electro-mechanical servo motor or stepper motor may be used. Similarly, two 2/2 (single in/out passageway) proportional valves may be used, at the expense of some additional size and/or weight and additional electrical power consumption, but with the benefit that both valves could be fully opened simultaneously.

The system has one pneumatic input 308, a supply of air at some moderate positive gauge pressure, and one output 310 that may be connected, for example, to a tool comprised of one or more soft actuators and a unifying hub. The pressure within the tool connected at the output, in this case, a series of accordion type soft actuators, is controllable within an absolute range between partial vacuum and the pressure supplied to the system input. A servo-pneumatic valve serves as the primary mechanical actuator of the closed loop control system and is supplied positively pressurized air from the system input at port 1. This air is directed in one of three ways at a flow rate proportional to the magnitude of the control signal and pressure supplied.

When supplied a zero-command input, all ports of the valve are blocked and no fluid is exchanged into or out of the system output (connected to the servo-pneumatic valve at port 4). When supplied a positive command input, the valve's spool is proportionally displaced in a direction which allows positively pressurized air from the system input to flow toward the system output (from port 1 to port 4), thereby raising the pressure within the actuator or set of actuators connected at the output at a rate determined by the magnitude of the servo-pneumatic valve's displacement in response to the positive command input, the restrictions present in the fluid conduction path between the system output and the actuator(s) themselves, and the volume of the actuator(s) and fluid conduction path at the output of the system. Alternatively, when supplied a negative command input, the valve's spool is proportionally displaced in a direction which permits positively pressurized air to flow toward the inlet of a vacuum generation unit 306 (from port 1 to port 2, which is connected to the vacuum generator's supply port).

This vacuum generator uses the "Venturi Effect," a phenomenon of fluid dynamics by which the pressure of a fluid is reduced when fluid flows through a constricted section of pipe. When such restricted flow becomes super-critical (that is to say that the fluid velocity exceeds the speed of sound) fluid pressures lower than the ambient condition can be created, achieving a partial vacuum at the application port of the Venturi Vacuum Generator 306. In exemplary embodiments, the servo-pneumatic valve features two ports normally used to exhaust air to the ambient environment (ports 3 and 5). When the valve is displaced such that air at the supply port flows toward one particular output port of the valve, the opposing output port is connected via a similar cross-sectional area to the corresponding exhaust port (for example, when port 1 is connected via a cross section to port 4, port 3 is connected to port 2 via an identical cross section). This alternating pressurization and exhaust of the left or right output ports of the servo-pneumatic valve is exploited to complete the pneumatic function of the proposed control system.

When the system is provided a negative command input, in addition to supplying the vacuum generation unit 306 with pressurized air as described previously, the application port of the vacuum generation unit 306 is simultaneously provided a fluid conduction path to the system output through the servo-pneumatic valve (because port 5 is connected to port 4 while port 1 is connected to port 2). And so, in the negative command state, while positively pressurized air flows through the vacuum generation unit's supply inlet at a flow rate proportional to the magnitude of the negative command input received by the servo-pneumatic valve, a partial vacuum is developed at the generator's application port which simultaneously draws air from the system output at a flow rate related to the same negative command input received by the servo-pneumatic valve and the size or specification of the vacuum generation unit's nozzle.

Finally, an absolute pressure sensing device 304 is connected to the system output either directly or via a small volume tuned in size to reject un-desirable signals produced by the operation of the servo-pneumatic valve. By modulating the effects of positive and negative command inputs to the system actuator (the servo-pneumatic valve), this sensor's feedback is used along with one of several linear or non-linear compensators to create a closed control loop which maintains a desired absolute pressure set-point. It is possible using this method to achieve profiles of motion within the soft actuator or hub of multiple soft actuators that exceeds 50 Hz in response bandwidth and is controlled with a steady state error of less than 0.1 psi in ranges of at least −10.0 psi to 90.0 psi gauge pressure.

An alternate control system uses the response of an ideal gas or incompressible liquid to a change in volume to achieve a similar level of control. Such a system is depicted in FIG. 4.

Figure 4:
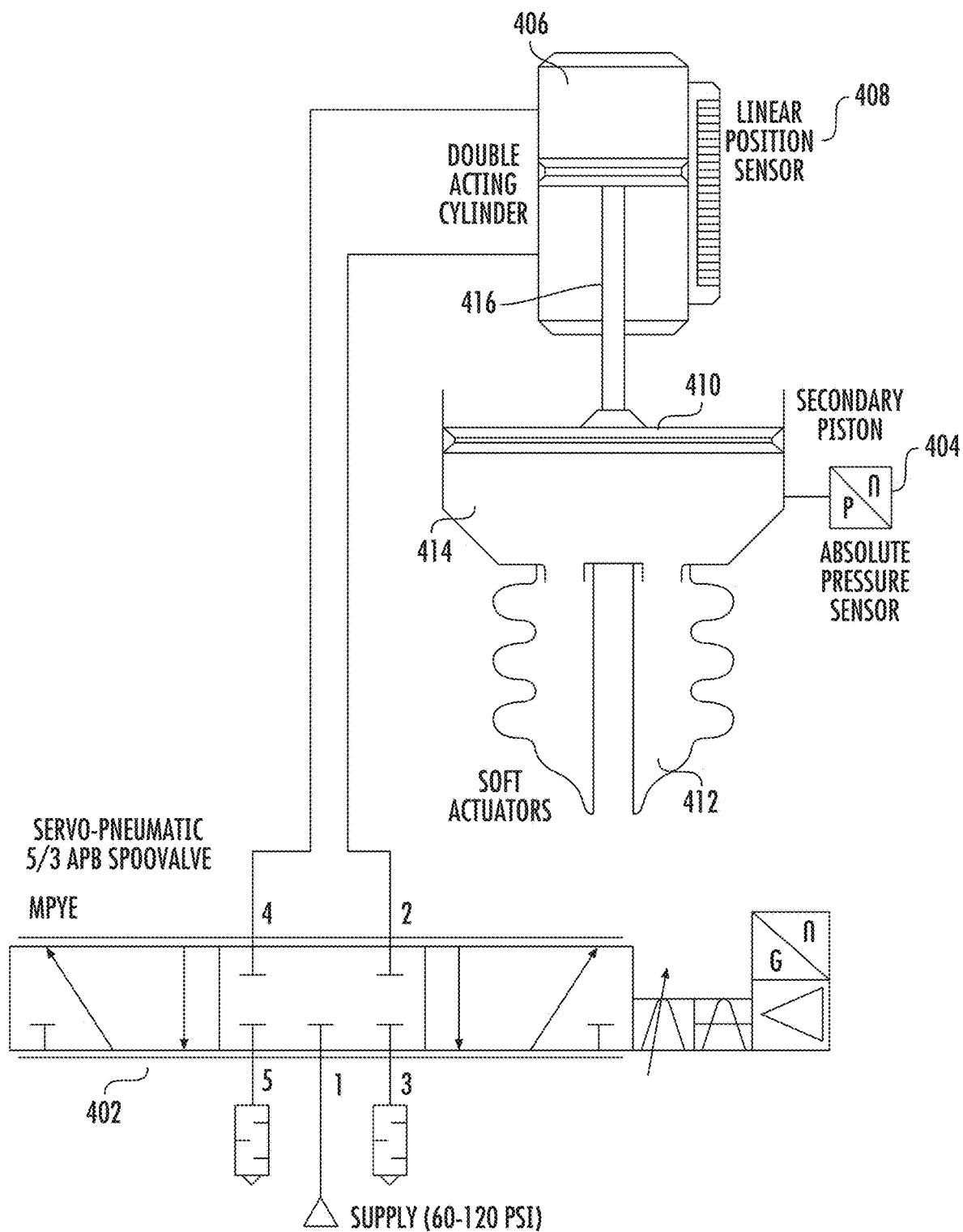
FIG. 4 depicts an exemplary servo-pneumatic control system according to exemplary embodiments.

FIG. 4 depicts an exemplary servo-pneumatic control system which uses a single supply of moderately pressurized air to maintain closed loop control of absolute pressure within a soft actuator or hub of multiple connected soft actuators. The system is comprised of a servo-pneumatic 5/3 APB (all ports blocked center) spool valve 402, an absolute pressure sensor 404, a double acting pneumatic cylinder 406, and a linear position sensor 408.

Similar to the previous embodiment, this system also uses a single supply of air at some moderate positive gauge pressure. In this case, pressurized air directed by the servo-pneumatic valve 402 is used in a more conventional manner to antagonistically control the position of a double acting pneumatic cylinder 406, which may be, for example, a type of piston driven linear actuator. In this embodiment, the system has no output port since the tool is not easily separable from the system. The size and stroke length of the cylinder is selected to drive a specific connected volume (number of actuators and overall hub interior). It is contemplated that an interchangeable tool could be created through the use of a mechanism that allows the secondary piston 410, actuator(s) 412, and hub body 414 to be changed together.

The servo-pneumatic valve 402 and double acting cylinder 406 together with a linear position sensor 408 can be used as a linear position controller to form a closed-loop control system that is able to maintain the position of the cylinder's piston rod with sub-millimeter precision. This linear position controller is a typical application for servo pneumatics. In this embodiment, the linear position controller is then used in a novel arrangement to antagonistically control the state of a soft actuator 412 or series of multiple soft actuators connected by a common "hub" 414. Control of the hub 414 and the interior pressure of the soft actuator(s) 412 is achieved by connecting some form of displaceable element (e.g. secondary piston 410, a flexible diaphragm, or a deformable closed bladder) directly to the position controlled linear actuator (e.g. the piston rod 416 of a servo-pneumatically controlled double acting cylinder). When this element is displaced, a change in the closed volume created by the displaceable element, hub, and soft actuator(s) occurs, which causes a change in pressure within that closed volume in accordance with the ideal gas law (e.g. when the working fluid is air or some other approximately ideal gas), or in accordance with the laws governing the behaviors of incompressible fluids (e.g. when the working fluid is water or some other incompressible liquid). In this way, the position of the position controlled linear actuator will correspond to a specific and highly repeatable pressure effected within the closed volume of the hub and actuator(s). If the displaceable element is driven forward, pressure within the closed hub 414 and actuator 412 volume will increase as the overall volume diminishes. If the displaceable element is retracted pressure within the closed volume will decrease into a partial vacuum as the overall volume increases. These two states are visually depicted in FIG. 5.

Figure 5B:
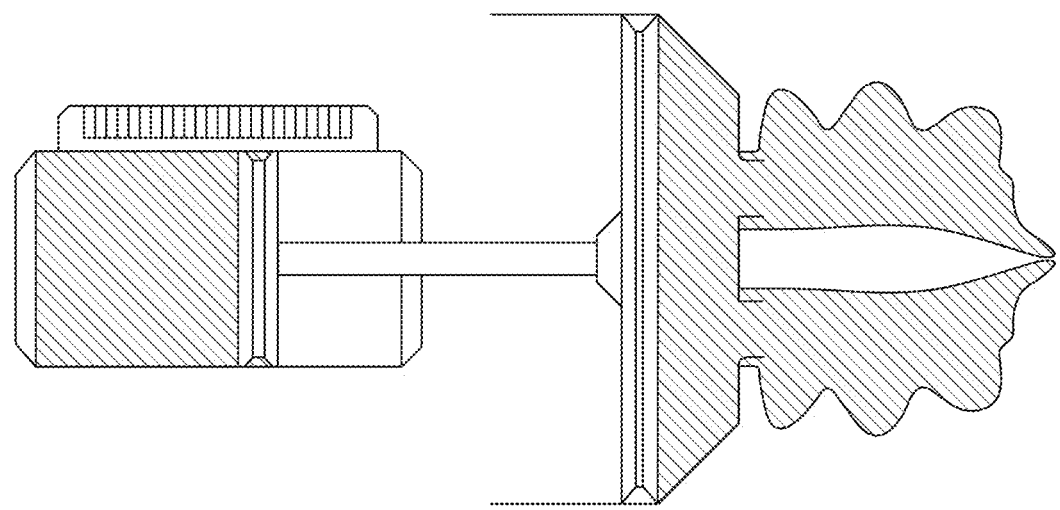
FIG. 5A-B depict a portion of the exemplary servo-pneumatic control system in unactuated and actuated states, respectively, according to exemplary embodiments.
Figure 5A:
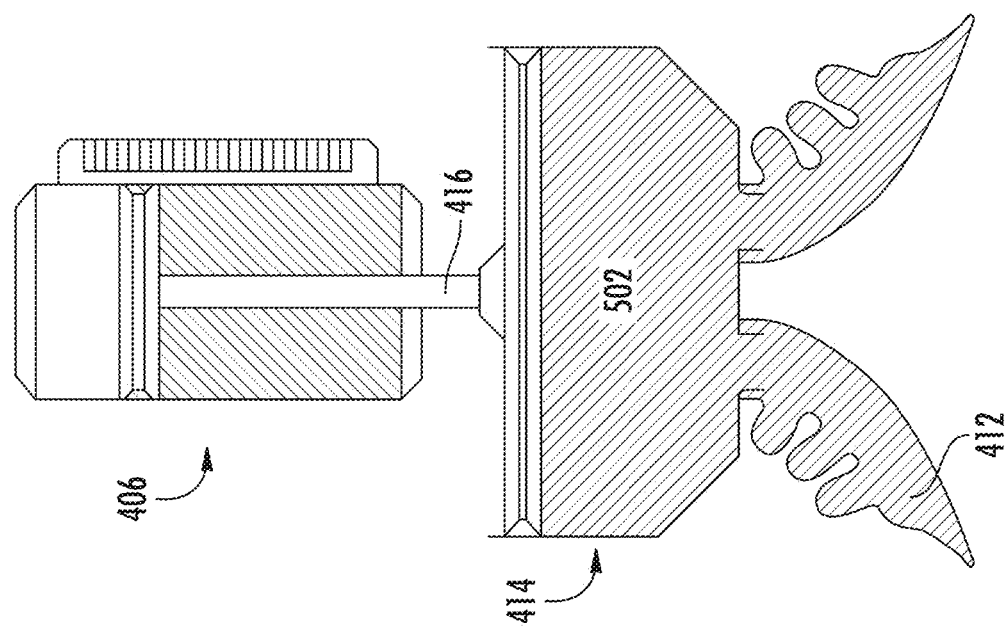

FIG. 5A-B: In FIG. 5A, the double acting cylinder 406 is commanded to a retracted position by pressurizing its lower port producing an upward force on the piston rod 416. This upward force draws out the displaceable element (e.g. a secondary piston) within the actuator hub 414 by the same distance, increasing the overall volume 502 within the hub and actuator(s), and creating a partial vacuum, which, in turn, opens the soft actuator(s) 412. Conversely, in FIG. 5B, the linear actuator of the double acting cylinder 406 is driven forward by an application of pressure to its top port producing a downward force on the piston rod. This downward force pushes the displaceable element within the actuator hub further toward the bottom of the hub, decreasing the overall volume within the hub and actuator(s) and creating a higher positive pressure which in turn grips the soft actuator(s).

Several factors may be freely changed to augment this system's performance. The displaceable element which forms the closed hub and actuator volume may be resized along with the length of its throw to increase or decrease the maximum positive or negative change in volume that can occur. This has the effect of changing the maximum positive gauge pressure and minimum vacuum to which the tool can be controlled. The bore diameter of the double acting cylinder may also be altered to change the maximum deliverable force it can impart upon the displaceable element at a given pressure or to change the pressure needed to drive the cylinder to a given force. An absolute pressure sensing device 304 connected to the actuator hub interior is also depicted in FIG. 3, and may be used to perform leak detection in operation or calibration of linear actuator position to a corresponding actuator pressure after the exchange of a new hub/actuator type or a prolonged period of suspended operation. Finally, it is also contemplated that the position controlled linear actuator used to create this control system need not necessarily be servo-pneumatically driven, but can instead be any form of mechanical linkage or electro-mechanical linear actuator. However, typical designs may require the development of forces in the hundreds of Newtons while still meeting extremely stringent size, weight, and power requirements common to industrial end of arm tools (EOAT) in robotic applications. In such cases, pneumatics is often the best way of delivering such high loads in a small and light actuator form factor (since the servo-pneumatic valve or other pneumatic cylinder control circuit needn't be at the distal end of the robotic manipulator along with the cylinder and actuator hub).

Controlling and Monitoring the Motion of an Actuator and/or Grasp Target

The embodiments described above may be used separately or in conjunction with the below-described techniques for controlling and monitoring actuators and/or grasp targets. The embodiments described below may be particularly well-suited to the fine-grained control offered by the servo-pneumatic control system.

As a soft robotic gripper moves a grasp target object from its pick position to its place position, it is commonly observed that this object can temporarily shift away from the center of the gripper. This is the result of the inertia of the object, which will oppose the motion of the gripper each time the robot accelerates or decelerates the gripper.

When moving delicate and/or deformable objects, this swaying may be beneficial since it acts to diminish the degree to which the object experiences abrupt acceleration or deceleration due to the robot rapidly translating the gripper from its pick to its place position. The reduction in acceleration or deceleration felt by the object in turn acts to diminish damage to the object.

This swaying can also be detrimental, because, if the object is swaying, it becomes difficult to accurately place the object upon release from the gripper. Furthermore, the swaying may cause the grasp to become unstable in severe cases, causing the gripper to lose hold of the target object while in motion. One way to resolve this problem is to have the gripper wait at the object placement location until the swaying of the object stops. Although effective, this strategy comes at the cost of increased time spent while waiting to begin the release operation.

Reducing sway may, in some cases, increase placement accuracy and placement speed. Furthermore, increasing sway may in some cases serve to protect delicate objects from sudden forces. Thus, it can be advantageous to control this swaying behavior by increasing or decreasing sway at certain times.

Figure 6A:
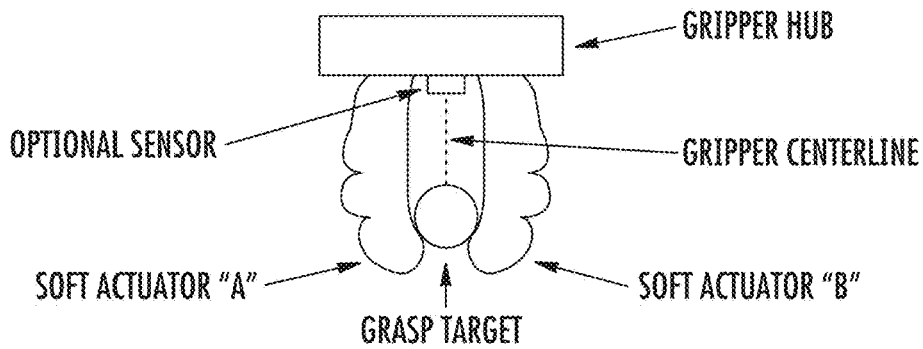
FIG. 6A-C depict an example of sway reduction in a gripper according to exemplary embodiments.
Figure 6B:
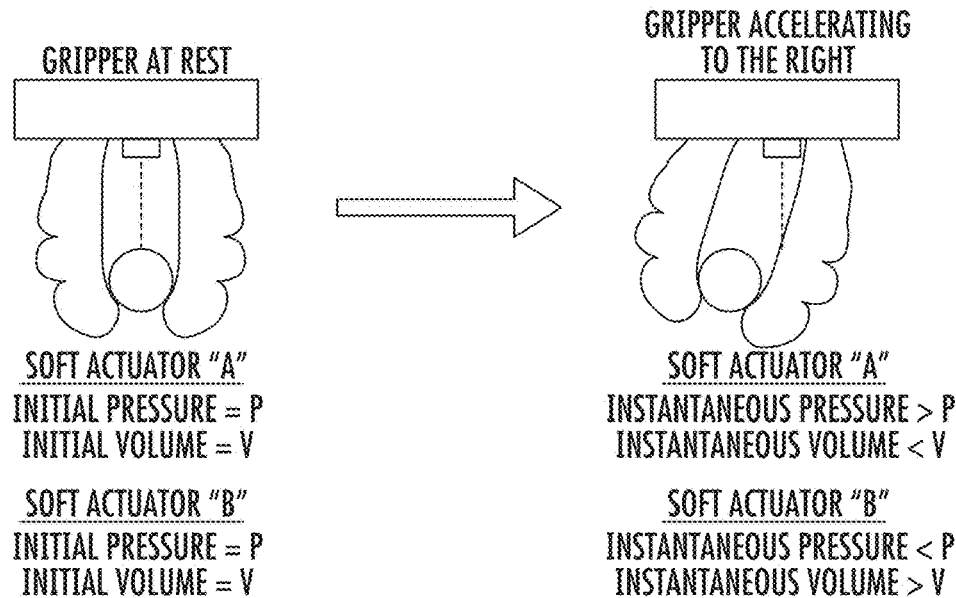
Figure 6C:
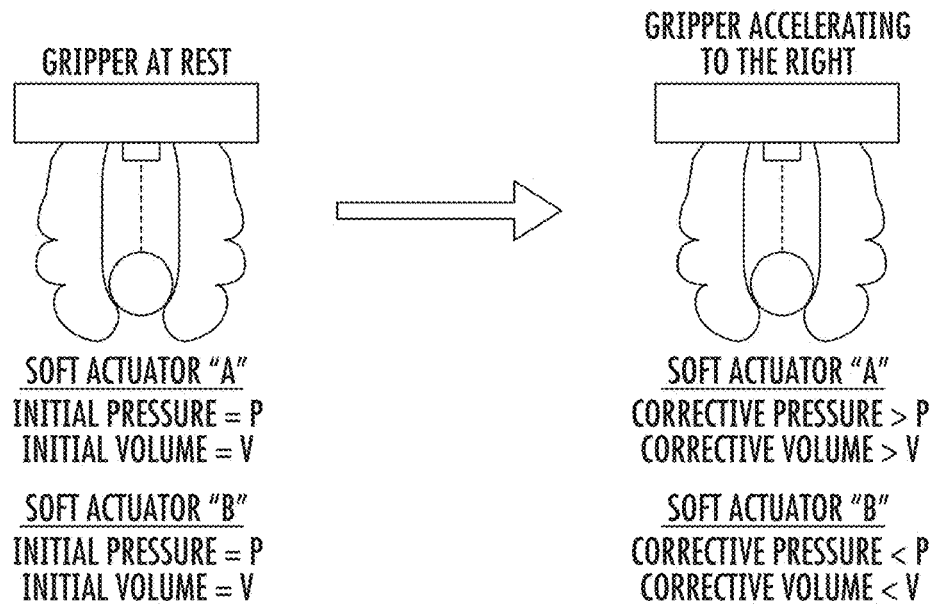

FIG. 6A-C shows an example of how to reduce the sway of an object by controlling the pressure application and air flow to each actuator of the gripper. FIG. 6A depicts the various parts of an exemplary soft robotic system.

On the left of FIG. 6B is a gripper at rest holding a grasp target. In this case, both actuators are inflated to the same pressure and have the same volume of pressurizing fluid. As a result, the actuators apply the same force on the grasp target. Since the force from each actuator on the grasp target is in direct opposition, the actuators act to center the object in the grip. On the right of FIG. 6B the gripper is accelerating to the right. Since the inertia of the grasp target resists this acceleration it has the effect of applying increased force on soft actuator "A" and decreasing the force it applies on soft actuator "B." This change in force application will have the momentary effect of compressing soft actuator "A" while allowing soft actuator "B" to extend with the net result of the grasp target moving to the left relative to the gripper.

FIG. 6C shows a way of compensating for this instantaneous change in force application. In this example the gripper (1) is capable of controlling the pressure and the volume of air supplied to each individual actuator, (2) has sensors that can rapidly sense that an object is moving away from the center of the gripper, and (3) uses a pneumatic circuit capable of adjusting the pressurizing fluid supply quickly in response to the data from these sensors.

In FIG. 6C, when the gripper accelerates to the right the actuators compensate by increasing the volume and pressure of the fluid in soft actuator "A" and decreasing the volume and pressure of the fluid in soft actuator "B." This will push the grasp target to the right thereby countering the effects of inertia and in turn will keep the object in place below the gripper centerline. It should be noted that in some embodiments the gripper has a sensor in the hub (e.g. a laser photo eye, a camera, an acoustic range finder, and so forth) for identifying whether a grasp target is moving out of the center of grasp, while still in other embodiments the system can rapidly sense changes in the pressure and volume of each actuator, which is used as an indirect measure of the object shifting out of the center of the grasp.

Note the inverse of the method above can be used to increase sway. This may be an effective way for protecting delicate and deformable objects in very high-speed pick and place applications.

In still another embodiment, the pressure and flow control is used not just to grab an object but to move it. For example, if the pressure on one actuator goes down while the pressure on an opposing actuator goes up, the grasp target will translate. This may be useful for making slight corrections to the position of the grasp target just before the object is released in scenarios where these corrective actions can be used to improve the accuracy and precision of placement of an object in a pick and place application.

In still another embodiment, the pressure and flow sensor readings associated with the object swaying are used as a means of grasp detection and/or to determine if an object has fallen out of grasp. This is possible since the degree to which the actuators sway during acceleration and deceleration will be higher if the actuators of the gripper are holding an object than if the gripper is not holding an object because the combination of actuators and grasp target have greater mass and therefore greater inertia than just the actuators alone. In addition, since, in a given application, the degree of sway will increase as the grasp target becomes more massive, the degree of sway can, as measured by the pressure and/or flow sensors, be used to guess the weight of the grasp target. Other techniques may also or alternatively be used to determine sway, such as providing an inertial sensor on the hub of the robotic gripper to predict a sway profile based on the measured acceleration of the gripper and a known weight of the grasp target, among other possibilities.

Control of Actuator Acceleration and Damping

Figure 7A:
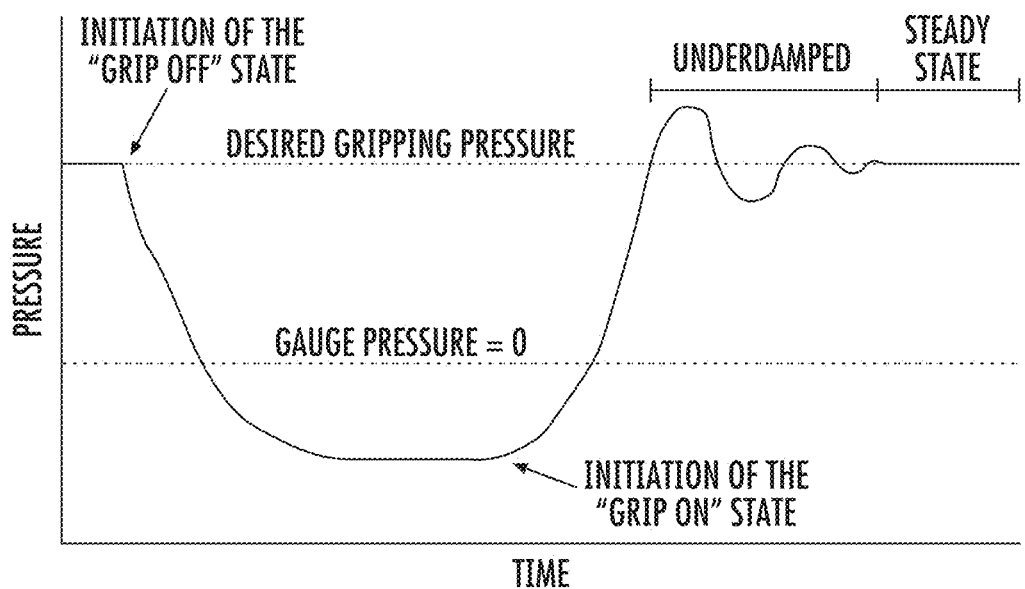
FIG. 7A-B depict undamped and damped time dependent pressure profiles for a gripper according to exemplary embodiments.

FIG. 7A depicts a time dependent pressure profile for a gripper. In this plot, the gripper is initially provided in an inflated state. Next, the control system for the gripper is given the "Grip Off" command, which initiates the application of vacuum to the gripper. The gripper then settles to a stable vacuum pressure, which results in the actuators of the gripper being curled backward and ready to grab its next grasp target.

Next, the gripper receives its "Grip On" command, which initiates the application of pressurizing fluid to the gripper. Finally, the gripper achieves a stable gripping pressure that allows it to hold a grasp target. As shown in FIG. 7A, before the gripper achieves its stable "steady state" gripping pressure, the system goes through a series of oscillations in pressure. This is the result of the fact that the combination of the elastomeric soft actuator and its compressible pressurizing fluid behaves like a spring-mass system that is underdamped. The result is that the actuators may experience rapid oscillation in the stresses applied to the elastomeric walls of the actuator. This effect may damage the actuator, resulting in a reduced life span for the actuator. Moreover, the actuators may bounce off of the surface of the grasp targets and/or oscillate the force applied to the surface of the grasp targets several times before settling into a stable grip. This may lengthen the time required to gain a grip on an object, thereby limiting the use of the gripper in high speed pick and place applications.

Figure 7B:
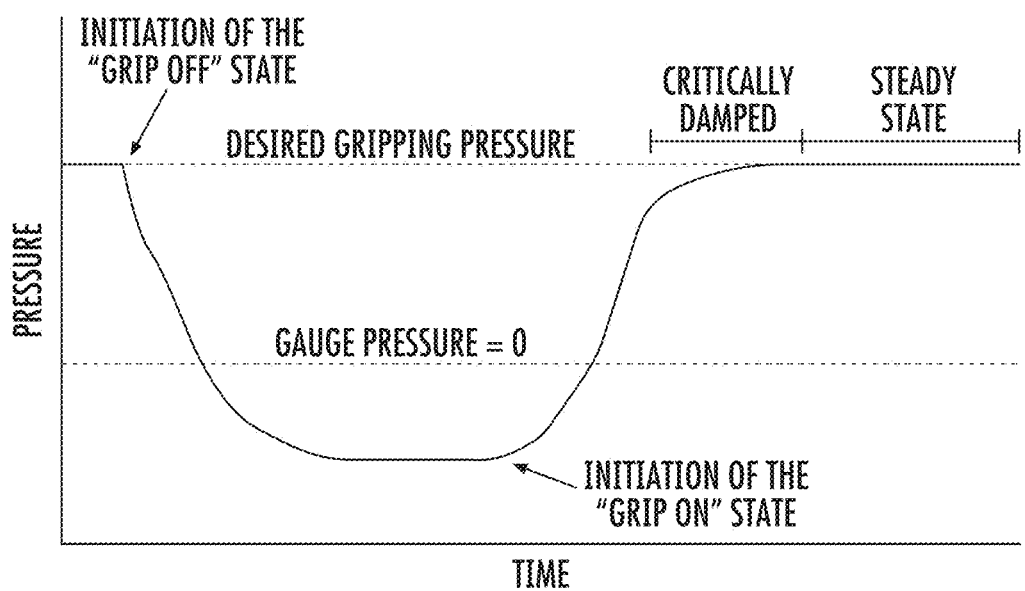

As a result, it is important to minimize these oscillations. By using closed-loop control of the pressure and/or flow rate of the pressurizing fluid it will be possible to create an inflation profile for the system that is critically damped. As shown in FIG. 7B, this may eliminate the pressure oscillation of the actuators during inflation, thereby reducing dynamic stresses on the actuator and improving gripping speed. Also, since this critically damped inflation profile requires that the actuators be decelerated just before contacting their grasp target, it will have the benefit of protecting fragile grasp targets because the actuators will make initial contact with less instantaneous force. In some embodiments, the dynamic pressure profile required to critically damp the systems oscillations is applied using a servo pneumatic valve. In still other embodiments, the dynamic pressure profile is achieved using pulse width modulation (PWM) control of conventional direct acting or piloted spool valves to restrict air flow through the valve on demand, thereby allowing for the deceleration of an inflation profile.

Note that there is an oscillation of the actuators upon application of vacuum to the gripper, and this, too, can be damped by using closed-loop control of the pressure and/or flow rate of the pressurizing fluid. In this case, (1) the rapid oscillation in the stresses applied to the elastomeric walls of the actuator is reduced during a transition to the vacuum state, which will help reduce damage to the actuators and (2) the speed of a pick and place application is increased because it is no longer necessary to have to wait for the actuators to stop oscillating in the vacuum state before giving the next inflation command. While the actuators can be inflated before they stop oscillating, this results in unpredictable inflation behavior.

The above description relates to oscillations after rapid application of vacuum to the tool. FIG. 7, on the other hand, depicts underdamped oscillations when inflating from vacuum to the desired gripping pressure. Nonetheless, both can be mitigated through these techniques.

Flow Based Control

When a soft gripper that is controlled by a closed loop pressure control system (e.g. an electro-pneumatic transducer) grips a highly deformable object (e.g. dough balls, sponges, ripe figs, etc.) it is found that the object slowly deforms over time. This occurs because, when the force from the actuator begins to deform the surface of the grasp target, the reaction force from the grasp target goes down. In response, the actuator will bend towards the newly deformed surface of the grasp target, creating an instantaneous drop in actuator pressure. Next, the closed loop pressure control system observes the drop in pressure at which time it delivers more pressurizing fluid to the actuator in order to maintain its current pressure set-point command. This delivery of pressurizing fluid causes the actuator to again apply force to the surface of the grasp target beginning another cycle of deformation. Since it is possible to sense the flow of pressurizing fluid to an actuator, it is also possible to sense that a gripper is deforming its grasp target and stop the process of destroying the grasp target.

Figure 8:
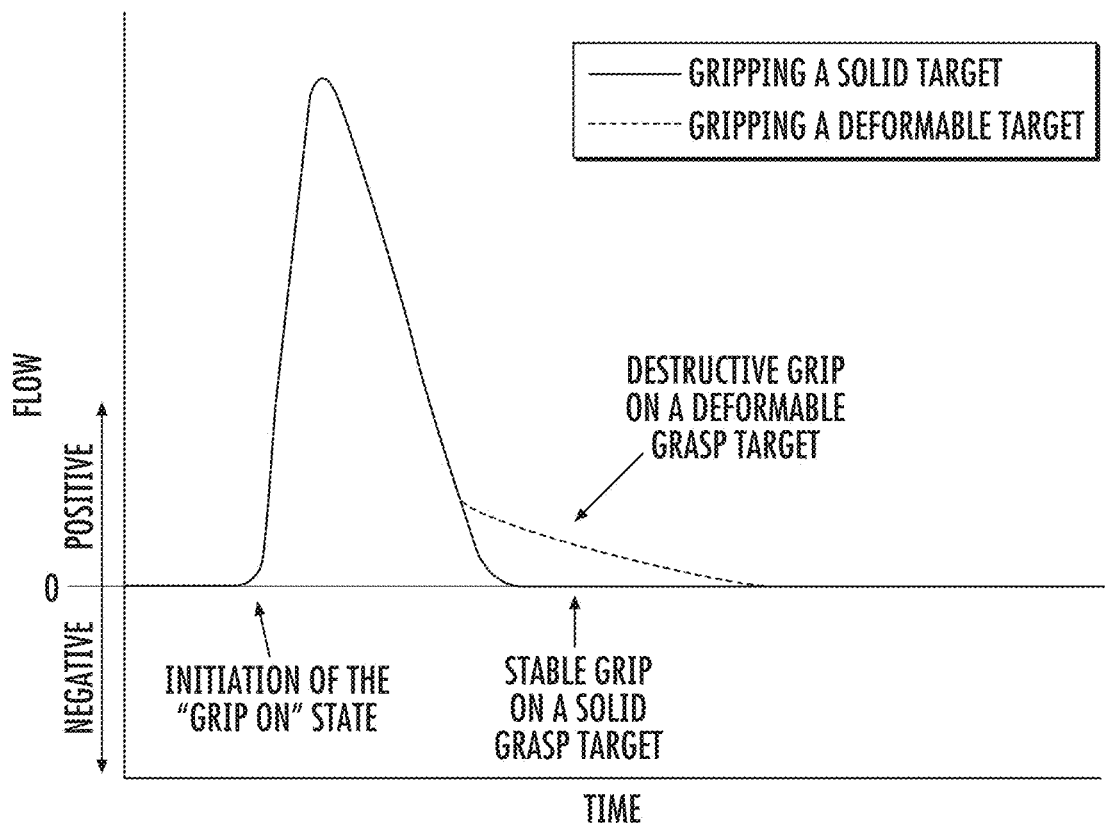
FIG. 8 depicts a comparison of a flow profile for a gripper, using a closed loop pressure control system, grasping a solid target and a deformable target according to exemplary embodiments.

FIG. 8 depicts a comparison of the flow profile for a gripper, using a closed loop pressure control system, grasping a solid target and a deformable target. In the case of the deformable target it can be seen that there is a small additional flow of air to the gripper after the initial grip on the object is achieved. By sensing this distinctive signature in the grippers flow response, it should be possible to signal a valve to shut off the air supply to the gripper thereby preventing further deformation of the grasp target. Note that in practice, this is a relatively slow, continuous "creeping" phenomenon; FIG. 8 is somewhat temporally exaggerated for clarity.

The stiffness of the materials that make up a soft actuator may change as a function of temperature. As a result, the degree of actuation of a soft actuator that is inflated to a constant pressure will change as a function of temperature. In the case of a soft robotic gripper this would mean that, for a given pressure, the degree to which the actuators of the gripper close will change as a function of temperature. In cases where it is important to maintain a constant degree to which the actuators of a gripper are closed, a flow based control system may be implemented for the gripper. The flow-based control may operate on the principle that a known volume of pressurizing fluid will generate a known curvature in an actuator, assuming the material is isotropic and its stress/strain tensor shifts proportionally the same in each region of the actuator (in situations in which these conditions do not hold, appropriate alterations may be made to the control scheme). In addition to measuring the volume of pressurizing fluid, the control may be based on the mass of added or removed fluid, the initial mass, the volume with respect to applied pressure, and ambient conditions (e.g., the ambient temperature).

This system of control can also be used to compensate for variations in the stiffness of an actuator. For example, since the stiffness of a manufactured elastomeric part can be difficult to hold constant (for example there could be batch to batch variations in the mechanical properties of the materials used to fabricate the actuator) there can be slight variations in the stiffness of individual actuators. In these cases, a flow based control system can again be used to allow an actuator to achieve a known degree of actuation in spite of a small change in actuator stiffness.

Predictive Maintenance

Pneumatic components will experience wear after a number of cycles of operation under normal conditions and/or if they are operated under conditions that are outside of their specification (e.g. if they are used with air that contains particulate, if they are used with air that is moist, if they are operated at an elevated temperature, etc.). Eventually these patterns of use may lead to part failure. If such a failure occurs in an automated industrial environment that is in the middle of production operations, this failure may, at a minimum, lead to a costly period of unpredicted system down time, and, at worst, create a safety hazard. By combining the controller for a soft robotic gripper with pressure and/or flow sensors, it becomes possible to observe the subtle symptoms that indicate an imminent failure of the controller or soft actuators, thereby giving system users advanced notification of the system's maintenance needs. These observations may also be used to identify changes that can be made to the systems operation in real time to reduce the wear on the soft robotic gripper or the soft robotic control system and then implement these changes to increase the life of the system's components.

For example, minor damage to the soft actuators that may eventually lead to actuator failure may be identified. For example, if the elastomer or plastic parts of a soft actuator are exposed to incompatible chemicals or a specific wavelength of light (e.g., ultraviolet light) the polymer can degrade causing a change in the mechanical properties of these materials such as their tensile and/or tear strength. This change in materials properties may be observed by measuring the pressure vs. flow response of an actuator on a periodic or continuous basis in order to assess whether the materials properties of the actuators have changed over the course of its operation in a customer application. For example, the stiffness of the elastomers in a soft actuator could be measured by incrementally increasing the air pressure in an actuator and measuring the flow of air in to the actuator for each increase in pressure. Here, the air pressure is the load placed on the elastomer and the flow of air into the actuator can be used to determine the total internal volume of the actuator, which in turn can be used to estimate the strain at points along the surface of the actuator, which in turn can be used to determine the stress at points along the surface of the actuator. Alternatively, the pressure can be raised and lowered at different rates to measure the time dependent pressure vs. flow relationship, which can then be used to measure dynamic aspects of the material's response. In either case, if the material's response is found to change over time, this could be a warning sign that an actuator failure is imminent.

Furthermore, pressure and/or flow sensors may be used to measure the time required for a gripper to inflate. In this case, if the time required for the control system to respond increases over the life of the control system, this may indicate that the spool of the valve that gates access to pressurizing fluid is becoming fouled. For example, if particulate is accumulating in the valve body, this might be observed as a slower response time for the spool to move between the states of the valve due to friction between the spool and the valve body, resulting in a slower onset of a change in flow and pressure in the system. It should be noted that this same idea for measuring the response time for the onset of pressure could be applied to measuring the onset of vacuum in order to assess the health of the components used to apply vacuum to the gripper.

Still further, since the spools of many pneumatic valves are coupled to a spring, pressure and/or flow sensors may be used to observe the mechanical oscillations of a spool as it comes to rest after it becomes activated. This oscillation would be observed as a damped oscillation of the pressure and/or flow in the system where a change in the rate of dampening of this signal could be indicative of a fouled valve. For example, if particulate is accumulating in the valve body, this might be observed as a high rate of dampening of the oscillation as a result of friction between the spool and the valve body.

In-Application Sensing

Flow based sensing may also be used as a means of grasp detection and as a means of determining the approximate size of a grasp target. For a given inflation pressure the amount of air required to actuate the actuators of a soft gripper will depend on whether the bending path of the actuators is obstructed, in this case by a grasp target. This is due to the fact that the bending motion of an accordion actuator may be created through two mechanisms 1) the straining of the elastomer of the actuator under pressure and 2) the unfolding of the actuator under pressure. Both of these mechanisms occur when an actuator receives a flow of pressurized air or other inflation fluid. Of these two mechanisms, the unfolding mechanism is substantially impeded if there is an obstruction along the path the actuator is unfolding (which is in the bending direction). As a result, once the actuator contacts the surface of an object it is no longer able to unfold and no longer increases in interior volume at the same rate.

This change in flow of the inflation fluid upon contacting an object can be sensed and used as a means of detecting whether the gripper has grasped an object. This sensing scheme can also be used to determine the approximate size of the object. The larger the object is, the more room it takes up between the actuators of the gripper and, in turn, the more it will obstruct the unfolding of the gripper's actuators when pressurized. Additionally, this system may also sense whether the gripper has dropped an object since, once the object has fallen out of grasp, the actuators will no longer be obstructed and will quickly take on more inflation fluid as the actuators continue to bend and increase in interior volume. Moreover, this sensing system can also be used to see if an object has shifted in grasp, since, in many cases, the shift in grasp will also change the degree to which the actuators are obstructed, which can be measured as a flow signal on a per actuator basis.

In the case of actuators that have more than one inflatable chamber, this flow based sensing system can be used to aid an actuator in obtaining a more conformal grasp on a delicate or deformable object without causing damage to the object. For example, suppose a bending actuator having two chambers, "A" and "B". During the course of actuating, the system chamber "A" makes contact with the grasp target but "B" does not. This would be sensed as "A" having a substantial reduction in flow but chamber "B" continuing to take on air. In this scenario, it would be possible to stop the flow of air to chamber "A" while continuing the flow of air to chamber "B". Air would then continue to flow to chamber "B" until that chamber contacted the grasp target, at which point its air flow would also be stopped. In this way, the actuator would be able to obtain a more conformal grip since now each chamber is making contact with the grasp target. It should be noted that this concept can be extended to actuators with a plurality of chambers.

Collision Sensing

A gripper collision with an object may result in an abrupt increase in the pressure of the actuators and a movement of air out of the actuators. This pressure and flow signal could therefore be used as a means of collision detection. This capability may be useful in applications where the gripper needs to pick and/or place objects in a cluttered environment. One such application would be picking a single object of interest out of a pile of objects located in a bin with the aid of 3D computer vision for identifying grasp targets. In these applications, it would be advantageous to pick multiple objects from the bin using a single 3D scan of the bin. But since the gripper is likely to collide with objects in the bin during each pick it is likely the objects in the bin will move rendering the past 3D scan no longer valid.

According to exemplary embodiments, a robotic system may include a 3D scanner and robotic gripper. The scanner may initially scan a target area, such as a bin, to identify one or more grasp targets. The system may then receive a command to grasp one of the targets, and the robotic gripper may be instructed to execute the grasp. If the system detects (e.g., using the above-described techniques) that the gripper has collided with a non-target object before, during, or after grasping of the target object, the system may instruct the scanner to re-scan the target area. On the other hand, if no such collision is detected, the system may refrain from rescanning the bin, and the previous scan may continue to be used to identify target objects.

Exemplary Logic

Included herein is a set of flow charts and logic flows representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9 is a flow chart depicting exemplary logic 900 for performing a method for controlling the sway of an object by controlling the pressure application and air flow to each actuator of the gripper according to exemplary embodiments.

The logic flow 900 may grasp a target with a gripper comprising a plurality of soft robotic actuators at block 902. For example, an inflation device, such as a servo-pneumatic valve, may receive a control signal to provide inflation fluid to the soft robotic actuators of the gripper such that the soft robotic actuators inflate, and change shape so as to contact the target object. See, e.g. FIG. 6A. The control signal may be received from a controller or other computing device.

The logic flow 900 may detect an acceleration of the gripper at block 904. For example, a sensor may detect an increase in force in one of the soft actuators from the target object and a decrease in force in another of the soft actuators. Alternatively, or in addition, the acceleration may be detected as a compression in one soft actuator and an extension in the other soft actuator, or a movement of the target object away from a center line (or other reference point) of the gripper. The embodiments are not limited to these examples. See, e.g. FIG. 6B.

The logic flow 900 may adjust a volume of fluid in a first one of the plurality of soft robotic actuators at block 906 in response to the detected acceleration to compensate for effects of inertia on the target. For example, the inflation device, e.g. the servo-pneumatic valve, may receive a control signal to provide inflation fluid to the soft robotic actuator in which the increase in force (or compression) is detected, while decreasing an amount of inflation fluid to the soft actuator in which a loss of force (or extension) is detected. See, e.g. FIG. 6C.

Figure 10:
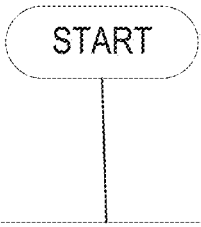
FIG. 10 is a second logic flow according to exemplary embodiments.

FIG. 10 is a flow chart depicting exemplary logic 1000 for performing a method for controlling oscillations in a gripper according to exemplary embodiments.

The logic flow 1000 may receive an instruction to actuate a soft robotic actuator at block 1002. For example, an inflation device, such as a servo-pneumatic valve, may receive a control signal to provide inflation fluid to the soft robotic actuator such that the soft robotic actuator inflates or otherwise actuates.

The logic flow 1000 may access an inflation profile at block 1004. The inflation profile may specify a deceleration of the soft robotic actuator immediately prior to contacting a grasp target to provide a damping effect. For example, a controller of a servo-pneumatic control system may access a stored inflation profile on a local storage or a remote storage for the soft robotic actuator. The critically damped inflation profile may require that the actuator be decelerated just before contacting a grasp target, and a degree of deceleration.

The logic flow 1000 may control inflation of the soft robotic actuator using a servo-pneumatic control system according to the inflation profile at block 1006. For example, the controller may apply the inflation profile using a servo pneumatic valve. In still other embodiments, the inflation profile is applied using pulse width modulation (PWM) control of conventional direct acting or piloted spool valves to restrict air flow through the valve on demand, thereby allowing for the deceleration of an inflation profile.

FIG. 11 is a flow chart depicting exemplary logic 1100 for performing a method for in-application sensing according to exemplary embodiments.

The logic flow 1100 may inflate a soft robotic actuator with an inflation fluid, wherein an interior volume of the soft robotic actuator increases at block 1102. For example, an inflation device, such as a servo-pneumatic valve, may receive a control signal to provide inflation fluid to the soft robotic actuator such that the soft robotic actuator inflates.

The logic flow 1100 may measure a flow response of the actuator during inflation at block 1004. For example, a sensor in or coupled to the actuator, and in communication with the controller, may detect an amount, a pressure, a temperature or other characteristic of inflation fluid entering (or exiting) the actuator.

The logic flow 1100 may detect a change in inflation fluid flow during inflation at block 1106 and may transmit a signal according to the detected change at block 1108. For example, the detected change may comprise a change in a rate at which the interior volume increases, and the transmitted signal may comprise a signal indicating that an object has been grasped by the actuator, and may also indicate an approximated size of the object.

In another example, the detected change may comprise a decrease in inflation fluid flow into the actuator (due to a collision), and the transmitted signal may indicate that the actuator has collided with an object.

In another example, the detected change may comprise an increase in inflation fluid flow into the actuator after an initial inflation, and the transmitted signal may indicate that an object has been dropped by the actuator.

In another example, detecting a change in inflation fluid flow (in block 1104) may include measuring a pressure versus flow response of the actuator during inflation. The pressure versus flow response may be compared to a previous pressure versus flow response of the actuator to determine a change in the pressure versus flow responses over time. The detected change may comprise determining, based on the change in the pressure versus flow responses, that the actuator is damaged or that a valve of a control system of the actuator is fouled. The transmitted signal may comprise a repair signal signifying that the actuator is damaged or that the valve is fouled.

Computing System and Network Implementation

Figure 12:
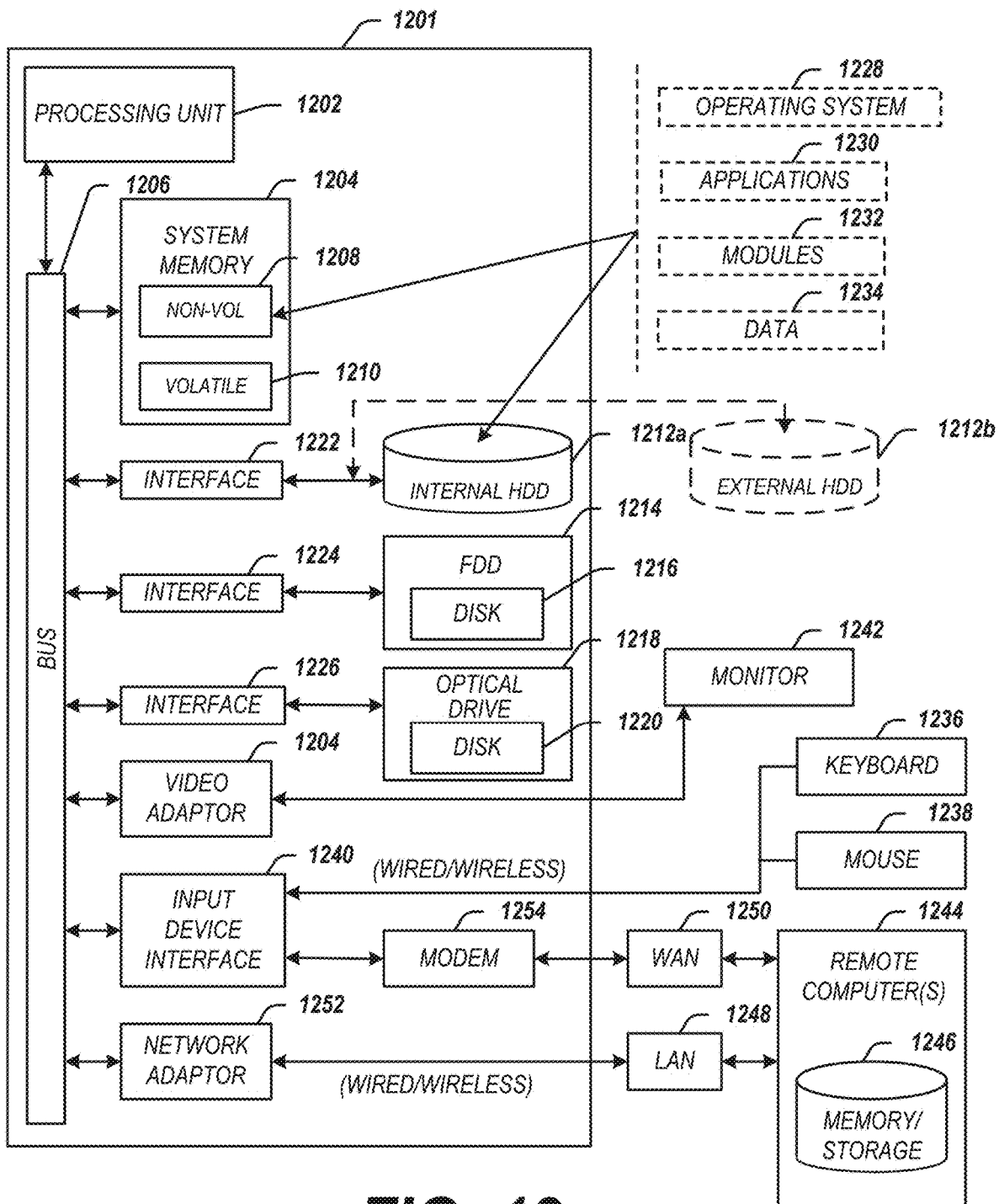
FIG. 12 is a block diagram illustrating an exemplary computing device suitable for use with exemplary embodiments.

The above-described techniques may be embodied as instructions on a non-transitory computer readable medium or as part of a computing architecture. FIG. 12 illustrates an embodiment of an exemplary computing architecture 1200 suitable for implementing various embodiments as previously described. In one embodiment, the computing architecture 1200 may comprise or be implemented as part of an electronic device, such as a computer 1201. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1202, a system memory 1204 and a system bus 1206. The processing unit 1202 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1202.

The system bus 1206 provides an interface for system components including, but not limited to, the system memory 1204 to the processing unit 1202. The system bus 1206 can be any of several types of bus structure that may further interconnect to a memory bus (with or without a memory controller), a peripheral bus, and a local bus using any of a variety of commercially available bus architectures. Interface adapters may connect to the system bus 1206 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1204 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1204 can include non-volatile memory 1208 and/or volatile memory 1210. A basic input/output system (BIOS) can be stored in the non-volatile memory 1208.

The computing architecture 1200 may include various types of computer-readable storage media in the form of one or more lower speed memory units, including an internal (or external) hard disk drive (HDD) 1212a, 1212b, a magnetic floppy disk drive (FDD) 1214 to read from or write to a removable magnetic disk 1216, and an optical disk drive 1218 to read from or write to a removable optical disk 1220 (e.g., a CD-ROM or DVD). The HDD 1212, FDD 1214 and optical disk drive 1220 can be connected to the system bus 1206 by an HDD interface 1222, an FDD interface 1224 and an optical drive interface 1226, respectively. The HDD interface 1222 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1208, 1212, including an operating system 1228, one or more application programs 1230, other program modules 1232, and program data 1234. In one embodiment, the one or more application programs 1230, other program modules 1232, and program data 1234 can include, for example, the various applications and/or components of the communication system 500.

A user can enter commands and information into the computer 1201 through one or more wire/wireless input devices, for example, a keyboard 1236 and a pointing device, such as a mouse 1238. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1202 through an input device interface 1240 that is coupled to the system bus 1206, but can be connected by other interfaces such as a parallel port, IEEE 694 serial port, a game port, a USB port, an IR interface, and so forth.

A monitor 1242 or other type of display device is also connected to the system bus 1206 via an interface, such as a video adaptor 1244. The monitor 1242 may be internal or external to the computer 1201. In addition to the monitor 1242, a computer typically includes other peripheral output devices, such as speakers, printers, and so forth.

The computer 1201 may operate in a networked environment using logical connections via wire and/or wireless communications to one or more remote computers, such as a remote computer 1244. The remote computer 1244 can be a workstation, a server computer, a router, a personal computer, portable computer, microprocessor-based entertainment appliance, a peer device or other common network node, and typically includes many or all of the elements described relative to the computer 1201, although, for purposes of brevity, only a memory/storage device 1246 is illustrated. The logical connections depicted include wire/wireless connectivity to a local area network (LAN) 1248 and/or larger networks, for example, a wide area network (WAN) 1250. Such LAN and WAN networking environments are commonplace in offices and companies, and facilitate enterprise-wide computer networks, such as intranets, all of which may connect to a global communications network, for example, the Internet.

When used in a LAN networking environment, the computer 1201 is connected to the LAN 1248 through a wire and/or wireless communication network interface or adaptor 1252. The adaptor 1252 can facilitate wire and/or wireless communications to the LAN 1248, which may also include a wireless access point disposed thereon for communicating with the wireless functionality of the adaptor 1252.

When used in a WAN networking environment, the computer 1201 can include a modem 1254, or is connected to a communications server on the WAN 1250, or has other means for establishing communications over the WAN 1250, such as by way of the Internet. The modem 1254, which can be internal or external and a wire and/or wireless device, connects to the system bus 1206 via the input device interface 1240. In a networked environment, program modules depicted relative to the computer 1201, or portions thereof, can be stored in the remote memory/storage device 1246. It will be appreciated that the network connections shown are exemplary and other means of establishing a communications link between the computers can be used.

The computer 1201 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
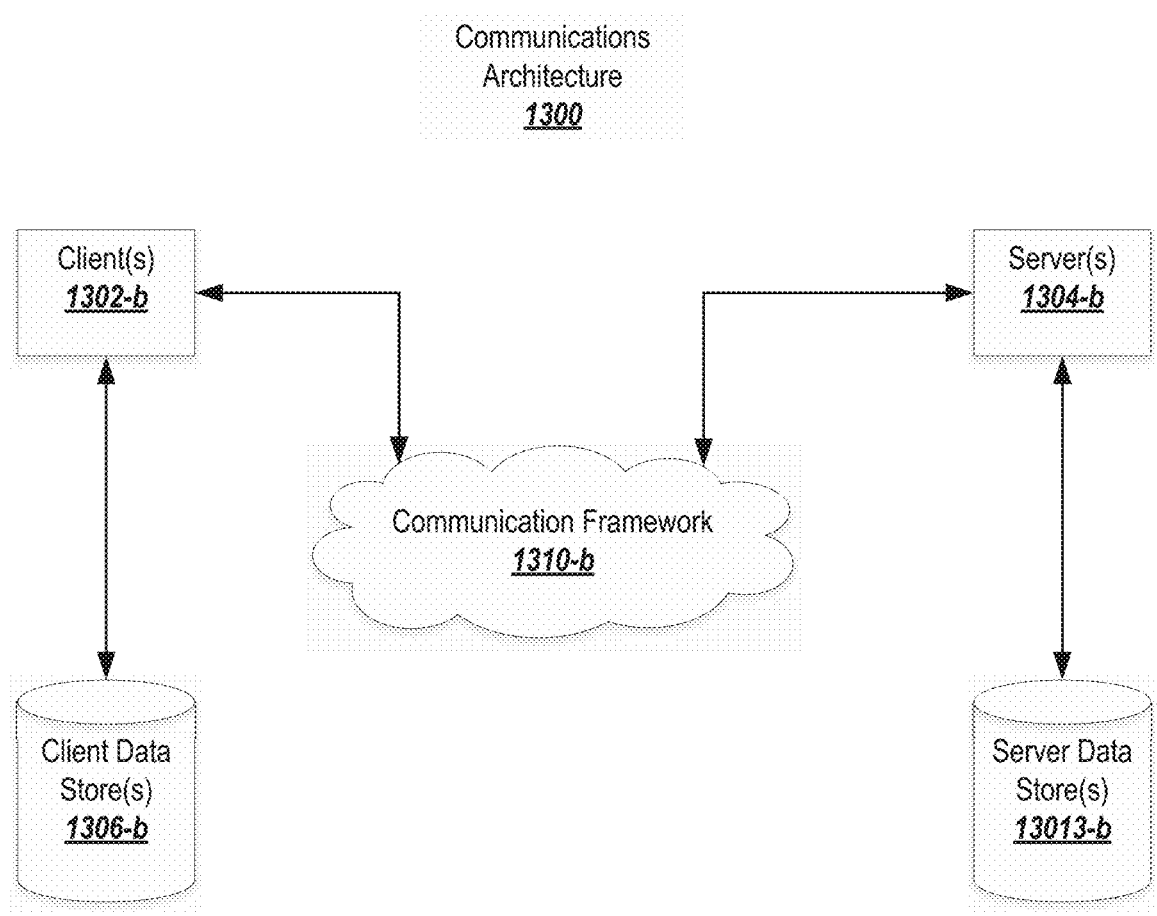
FIG. 13 depicts an exemplary communication architecture.

FIG. 13 is a block diagram depicting an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 includes one or more clients 1302 and servers 1304. The clients 1302 and the servers 1304 are operatively connected to one or more respective client data stores 1306 and server data stores 1308 that can be employed to store information local to the respective clients 1302 and servers 1304, such as cookies and/or associated contextual information.

The clients 1302 and the servers 1304 may communicate information between each other using a communication framework 1310. The communications framework 1310 may implement any well-known communications techniques and protocols. The communications framework 1310 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1310 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

CONCLUSION

Any or all of the above-described techniques may be implemented by suitable logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

What is claimed is:

1. An apparatus comprising:
a soft robotic actuator;
a vacuum generation unit comprising an inlet and an outlet; and
a servo-pneumatic control system in fluid communication with the soft robotic actuator comprising:
a spool configured to be displaced in a first direction or a second direction,
a first port configured to receive a positively pressurized inflation fluid,
a second port connected to the soft robotic actuator, and
a third port connected to the inlet of the vacuum generation unit;
the servo-pneumatic control system configured to maintain a closed loop in which at least one of pressure, mass of fluid, or volume of fluid is controlled within the soft robotic actuator by displacing the spool to selectively open or close the first, second, or third ports.

2. The apparatus of claim 1, wherein the valve is a 5/3 all ports blocked center spool valve.

3. The apparatus of claim 1, wherein the control signal is associated with a control value.

4. The apparatus of claim 3, wherein the control value is zero, and in response to the control signal the valve is configured such that fluid is not exchanged into or out of an output of the control system.

5. The apparatus of claim 3, wherein the control value is a positive value, and the valve is displaced proportional to the control value in a direction allowing positively pressurized inflation fluid to flow from an input of the control system toward an output of the control system.

6. The apparatus of claim 3, wherein the control value is a negative value, and the valve is displaced proportional to the control value in a direction allowing pressurized inflation fluid to flow toward an inlet of a vacuum generation unit.

7. The apparatus of claim 1, wherein the vacuum generation unit is configured to generate a Venturi effect.

8. The apparatus of claim 1, further comprising an absolute pressure sensing device providing sensor feedback, and further comprising a controller configured to use the sensor feedback to modulate the effects of positive and negative command inputs to the valve.

9. The apparatus of claim 1, wherein the control is based at least partly on temperature.

10. A method comprising:
grasping a target with a gripper comprising a plurality of soft robotic actuators;
detecting an acceleration of the gripper; and
adjusting a volume of fluid in a first one of the plurality of soft robotic actuators in response to the detected acceleration to compensate for effects of inertia on the target.

11. The method of claim 10, wherein detecting the acceleration of the gripper comprises: detecting a movement of the target object away from a center of the gripper.

12. The method of claim 10, wherein detecting the acceleration of the gripper comprises:
detecting one of an increase in force or a compression of a first soft robotic actuator and
detecting one of a decrease in force or an extension of a second soft robotic actuator, and
wherein adjusting the volume of fluid comprises:
providing inflation fluid to the first soft robotic actuator and decreasing an amount of inflation fluid to the second soft actuator.

13. A method comprising:
receiving an instruction to actuate a soft robotic actuator;
accessing an inflation profile, the inflation profile specifying a deceleration of the soft robotic actuator immediately prior to contacting a grasp target to provide a damping effect; and
controlling inflation of the soft robotic actuator using a servo-pneumatic control system according to the inflation profile.

14. A method comprising:
inflating a soft robotic actuator with an inflation fluid, wherein an interior volume of the soft robotic actuator increases;
measuring a flow response of the actuator during inflation;
detecting a change in inflation fluid flow during inflation;
transmitting a signal according to the detected change.

15. The method of claim 14, wherein the detected change comprises a change in a rate at which the interior volume increases, and the transmitted signal comprises a signal indicating that an object has been grasped by the actuator.

16. The method of claim 15, wherein the signal further indicates an approximated size of the object.

17. The method of claim 14, wherein the detected change comprises a decrease in inflation fluid flow into the actuator, and the transmitted signal indicating that the actuator has collided with an object.

18. The method of claim 14, wherein the detected change comprises an increase in inflation fluid flow into the actuator after an initial inflation, and the transmitted signal indicating that an object has been dropped by the actuator.

19. The method of claim 14, wherein detecting a change in inflation fluid flow comprises:
  measuring a pressure versus flow response of the actuator during inflation;
  comparing the pressure versus flow response to a previous pressure versus flow response of the actuator to determine a change in the pressure versus flow responses over time;
  determining, based on the change in the pressure versus flow responses, that the actuator is damaged or that a valve of a control system of the actuator is fouled; and
  wherein transmitting the signal comprises transmitting a repair signal signifying that the actuator is damaged or that the valve is fouled.

* * * * *